United States Patent [19]

Pizzuti et al.

[11] 4,153,903

[45] May 8, 1979

[54] LENS SHIELD ACTUATED AUTO/MANUAL FOCUS CONTROL INHIBIT/OVERRIDE

[75] Inventors: Donato F. Pizzuti, Saugus; Charles W. Triggs, Marshfield, both of Mass.

[73] Assignee: Polaroid Corporation, Cambridge, Mass.

[21] Appl. No.: 838,585

[22] Filed: Oct. 3, 1977

[51] Int. Cl.[2] .......................... G03B 3/00; G03B 17/02
[52] U.S. Cl. ..................................... 354/195; 354/288; 354/289
[58] Field of Search ................... 354/25, 83, 163, 195, 354/288, 289; 352/139, 140; 250/201; 340/221; 353/101; 350/46, 255, 187

[56] References Cited

U.S. PATENT DOCUMENTS

| | | | |
|---|---|---|---|
| 3,224,351 | 12/1965 | Strasser | 350/187 |
| 3,482,500 | 12/1969 | Thomas | 352/140 X |
| 3,522,764 | 8/1970 | Biber | 354/195 |
| 3,683,777 | 8/1972 | Miyagawa | 354/25 |
| 3,834,796 | 9/1974 | Komine | 350/187 |
| 3,871,756 | 3/1975 | Stieringer | 354/25 X |
| 3,940,777 | 2/1976 | Komine | 352/140 X |
| 4,005,460 | 1/1977 | Mizukawa | 354/192 X |
| 4,057,327 | 11/1977 | Kumazawa | 354/195 X |

*Primary Examiner*—L. T. Hix
*Assistant Examiner*—William B. Perkey
*Attorney, Agent, or Firm*—John J. Kelleher

[57] ABSTRACT

In a variable focus lens system in general, or in a photographic camera having such a system in particular, a simplified, compact, combination manual and automatic focus conrol system is provided having manual and distance responsive automatic focus controls that are coupled to one another in a driving relationship. Included with said focus control system is a displaceable cover that impedes access to the actuator of said manual focus control to prevent simultaneous manual and automatic focus control actuation. Cover movement is accomplished by rotating a light shielding collar member that is mounted for rotation about the principal image forming axis of said variable focus lens system, said cover being coupled to said collar for movement therewith.

11 Claims, 6 Drawing Figures

LENS SHIELD ACTUATED AUTO/MANUAL FOCUS CONTROL INHIBIT/OVERRIDE

BACKGROUND OF THE INVENTION

1. Field of the Invention

The present invention relates to variable focus lens systems having both automatic and manual focusing means in general, and to such lens systems for photographic cameras, in particular.

2. Description of the Prior Art

Variable focus lens systems having coupled rangefinders, such as those found in certain photographic cameras, are well known in the prior art. The most widely used coupled rangefinder is that of the manually actuated optical type that uses triangulation to determine the distance to the subject to be photographed, which is more commonly referred to as subject distance. Coupled rangefinders that automatically determine subject distance by utilizing radiant or acoustical energy reflected from said subject and then transfer or couple the distance derived by such means to the variable focus lens system of a camera to position said lens system to the correct in-focus position, are also known in the prior art. One such automatic system utilizing reflected acoustical energy is described in U.S. Pat. No. 3,522,764 to BIBER et al.

When utilizing a lens focusing system of the type described in the above-mentioned patent, certain conditions may exist that could render such a focusing system ineffective. For example, an acoustical rangefinder cannot effectively focus the variable focus lens system of a camera on a subject to be photographed if such a subject is separated from the camera by a windowpane, especially of such a pane was in relatively close proximity to said camera and said subject was relatively remote. This problem is briefly mentioned in the above-mentioned BIBER et al. patent at column 8, lines 4-6. In such a situation, acoustical energy would be reflected from the windowpane, incorrectly indicating that the subject distance was substantially less than its true distance. This erroneous distance information supplied by the acoustical rangefinder would then cause the variable focus lens system to form an out-of-focus image at its focal plane which, in the case of a camera, would result in an out-of-focus photograph. This problem could be avoided if the variable focus lens system or camera having such a system had both manual and automatic focus controls. A manually operated optical type coupled rangefinder, for example, is not rendered ineffective if utilized to focus on a subject through transparent media such as a windowpane.

If a variable focus lens system and, specifically, a variable focus lens system in a photographic camera, has both manual and automatic focus controls as mentioned above, wherein said focus controls are mechanically coupled to one another in a driving relationship, intentional or unintentional actuation of the manual focus actuating means while automatically focusing said variable focus lens system may interfere with the automatic focus control system's ability to correctly focus said camera and, in addition, such actuation of the manual focus control system may overstress structural components of both focusing systems. Simultaneous actuation of the manual and automatic focus control systems can be avoided if the manual focus actuating means is provided with a protective barrier or cover that impedes access to said manual focus actuating means. Such a cover would have to be displaced before the manual focus system could be actuated.

One such arrangement is described in U.S. patent application Ser. No. 833,581 by OSTROWSKI et al. filed on the same date and having the same assignee as the present application. In said OSTROWSKI et al. application, a variable focus lens system having mechanically coupled manual and automatic focus controls is disclosed. Simultaneous actuation of the manual and automatic focus control systems is avoided by providing the manual focus actuating means with a displaceable protective cover which impedes access to said manual focus actuating means. While this arrangement is quite effective in terms of avoiding such simultaneous actuation, it does so with structure that is not compatible with a minimum size housing with its attendant cost advantages. Minimum housing size could be achieved if the entire manual focus actuating means and a protective cover for said manual focus actuating means, together with actuating means for said protective cover, were mounted for rotation about the principal image forming axis of said variable focus objective lens. The manual focus actuator and its associated displaceable cover could be included within a housing that conformed to the general shape of the housing enclosing said variable focus objective lens.

Actuation of said displaceable cover could be accomplished by the rotation of a lens shield that is mounted for rotation about the principal image forming axis of said lens system and is coupled to said cover. If such a lens shield projected well beyond the housing of said variable focus lens system, it would be readily accessible for manual actuation.

SUMMARY OF THE INVENTION

In accordance with the present invention, a variable focus lens system having a principal image-forming axis is provided, wherein said system includes simplified and compact manual and distance responsive automatic focus controls that are mechanically coupled to one another in a driving relationship. Incorporated in said focus controls are means for manually overriding said automatic focus control by removing a portion of the power being supplied thereto, said manual overriding being initiated by movement of a displaceable cover impeding access to the manual focus control actuator. Both the manual focus control actuator and the access impeding displaceable cover are mounted for rotation about the principal image forming axis of said variable focus lens system. The actuator of said cover projects well beyond the housing of said variable focus lens system to facilitate displaceable cover manual actuation.

DESCRIPTION OF THE PREFERRED EMBODIMENTS

Figure 1:
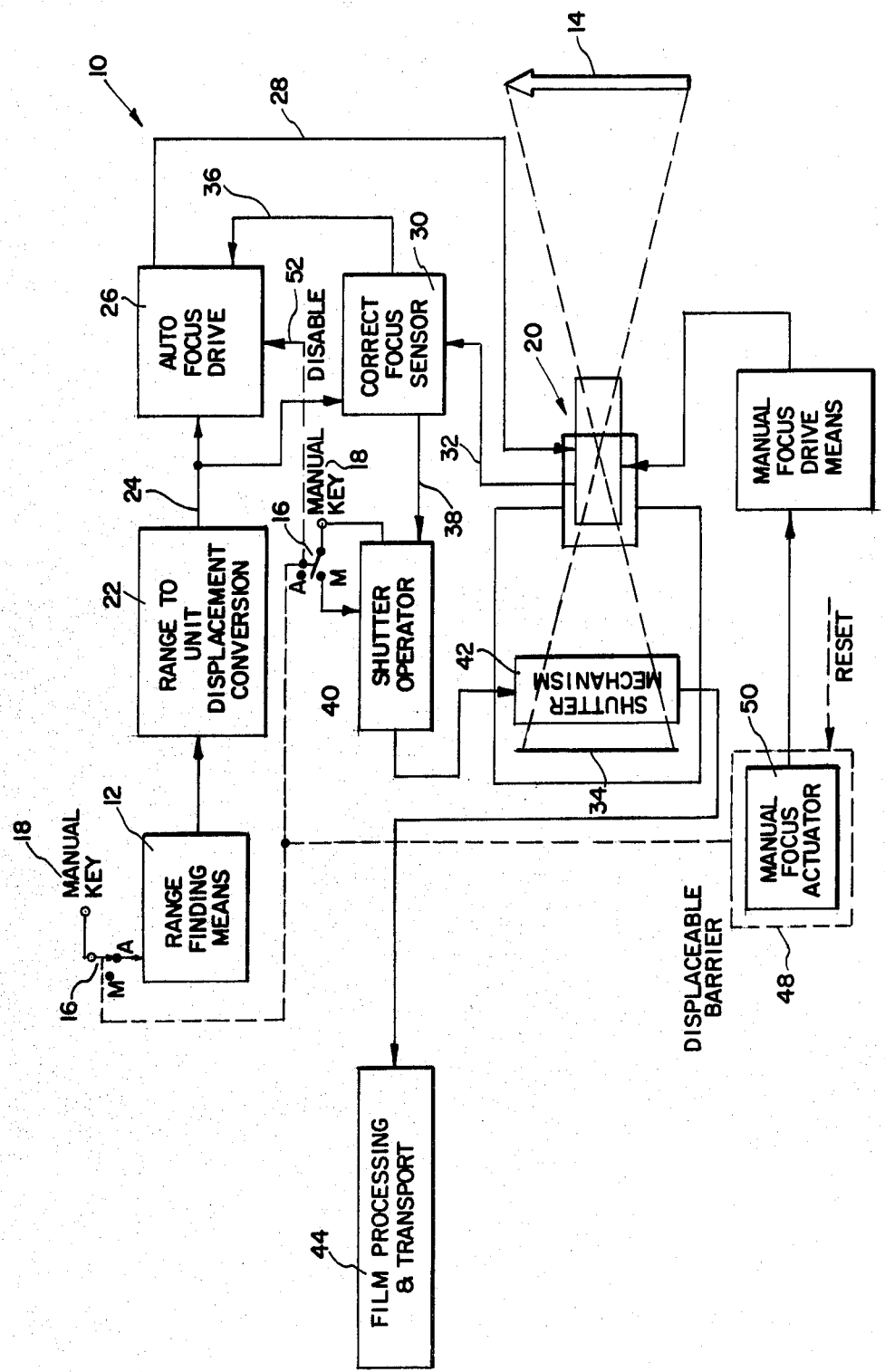
FIG. 1 is a functional block diagram of a photographic camera having both manual and automatic focus controls and having manually actuated automatic focus control override means constructed in accordance with a preferred embodiment of the present invention.

Referring now to the drawings and specifically to FIG. 1, which is a functional block diagram of photographic camera 10 of the type that utilizes self-developing film such as those that are commercially available under the trademark Polaroid Pronto! Land Camera, said camera having both manual and distance responsive automatic focus controls, and having a manually actuated automatic focus control override that is constructed in accordance with a preferred embodiment of the present invention. In FIG. 1, functional block 12 represents the means for determining the distance to subject 14 from said photographic camera 10. This rangefinding means can have more than one form but in this, the preferred embodiment, the form is that of an acoustical type coupled rangefinder similar to that described in copending application Ser. No. 840,802 by J. Muggli, which is assigned to the assignee of the present invention.

After placing automatic/manual mode select switch 16 in the automatic position or to "A", the rangefinding sequence is initiated by a camera operator depressing manual key 18 which may take the form of an electrical switch. In such a system, keying of rangefinding means 12 by manual key 18 causes acoustical energy to be transmitted toward subject 14 from said rangefinding means 12. This transmitted acoustical energy is subsequently reflected by said subject 14 and the resultant echo is detected by rangefinding means 12. The length of time taken for this sonic energy to reach subject 14 and return to rangefinding means 12 is a fairly good indication of actual subject 14 distance. Once subject distance is determined, this distance is converted into the proper form for positioning camera 10 variable focus lens 20 to the correct subject-in-focus position, by range-to-unit displacement converter 22, which compensates for the extremely nonlinear relationship between the axial position of a lens at which a subject is in focus and the actual distance to said subject from said lens. Once this conversion is complete, lens drive signal 24 is sent to autofocus drive means 26 to initiate the movement of variable focus lens 20 toward the correct subject-in-focus position. Upon receipt of range signal 24, autofocus drive means 26 generates lens actuating force 28 which is then applied to variable focus lens 20. At this point, variable focus lens 20 starts to move toward the subject-in-focus position as determined by rangefinding means 12. Correct focus sensor 30 monitors the actual movement of variable focus lens 20 through path 32. When variable focus lens 20 has correctly focused the image of subject 14 on focal plane 34 of camera 10, as determined by the appropriate relationship between lens drive signal 24 and the lens position signal received through path 32, correct focus sensor 30 sends an autofocus lens drive termination signal to autofocus drive means 26 through path 36.

In addition to sending an autofocus lens drive termination signal to autofocus drive means 26, correct focus sensor 30 sends exposure initiate signal 38 to shutter operator 40. Shutter operator 40, in turn, trips shutter mechanism 42. After shutter mechanism 42 has completed its operation, film processing and transport cycle 44 within self-developing film camera 10 as initiated.

If for some reason it is desirable to manually focus variable focus lens 20, the manual focus mode is selected by placing automatic/manual mode select switch 16 in its manual position or to "M". To actuate manual focus drive means 46, displaceable barrier or cover 48, shrouding or impeding access to manual focus actuator 50, is manually moved from its protective position where it impedes ready access to manual focus actuator 50, to its displaced position where it is spaced from and no longer impedes such access to said manual focus actuator 50. Displaceable cover 48 is mechanically linked to automatic/manual mode select switch 16. Therefore, movement of said cover 48 from its protective to its displaced position actuates switch 16 from its automatic to its manual position or from "A" to "M" which is the normal way that said switch 16 is so actuated. Movement of displaceable cover 48 also sends disable signal 52 to autofocus drive means 26, said disable signal 52 causing the removal of a portion of the electrical power being supplied to said autofocus drive means 26. In addition to disabling autofocus drive means 26, removing a portion of the power being supplied to autofocus drive means 26, while the camera 10 focus control system is in the manual mode, reduces unnecessary power drain from the batteries (not shown) of photographic camera 10. Once the manual focusing of variable focus lens 20 is complete, a film exposure cycle is initiated by depressing manual key 18. With automatic/manual mode select switch 16 placed in its manual position by the manual displacement of protective cover 48, a manual exposure initiate signal generated by key 18 will be sent to shutter operator 40 only.

The operating sequence of shutter mechanism 42 and film processing and transport cycle 44 from this point on is the same as when the camera 10 focus control system is in its automatic mode and shutter operator 40 receives exposure initiate signal 38 from correct focus sensor 30.

To return the focus control system of camera 10 to the automatic focus control mode, displaceable cover 48 is manually reset from its displaced or manual focus position, to its protective or automatic focus position so that it again impedes access to manual focus actuator 50. The resetting of displaceable cover 48 to its protective position removes disable signal 52 from autofocus drive means 26 and returns automatic/manual mode select switch 16 to "A" or to its automatic position. Removing disable signal 52 from autofocus drive means 26 causes the reapplication of the power to autofocus drive means 26 that was removed when cover 48 was displaced and the manual focus mode was selected. After automatic/manual mode select switch 16 is returned to its automatic mode by placing displaceable cover 48 in its protective position, autofocus drive means 26 returns the entire focusing system to a predetermined position or starting point for subsequent automatic operation. The above-described and referenced acoustical rangefinder is not ready to automatically determine distance to a subject to be photographed and to couple or transfer this acoustically determined distance to the variable focus lens system 20 of camera 10. Subsequently depressing manual key 18 with automatic/manual mode select switch 16 in its automatic position will initiate an automatic acoustical rangefinding sequence and film exposure cycle, respectively.

Autofocus drive means 26 includes a rotary actuator for use when acoustically positioning the variable focus lens 20 to the correct subject-in-focus position, when camera 10 is in its automatic focusing mode. Also, as previously discussed, manual focusing of said variable focus lens 20 can be accomplished by the actuation of manual focus actuator 50 and manual focus drive means 46. The specific details of these focusing means and how they are incorporated into self-developing type photographic camera 10 can be more clearly understood by referring to FIG. 2.

Figure 2:
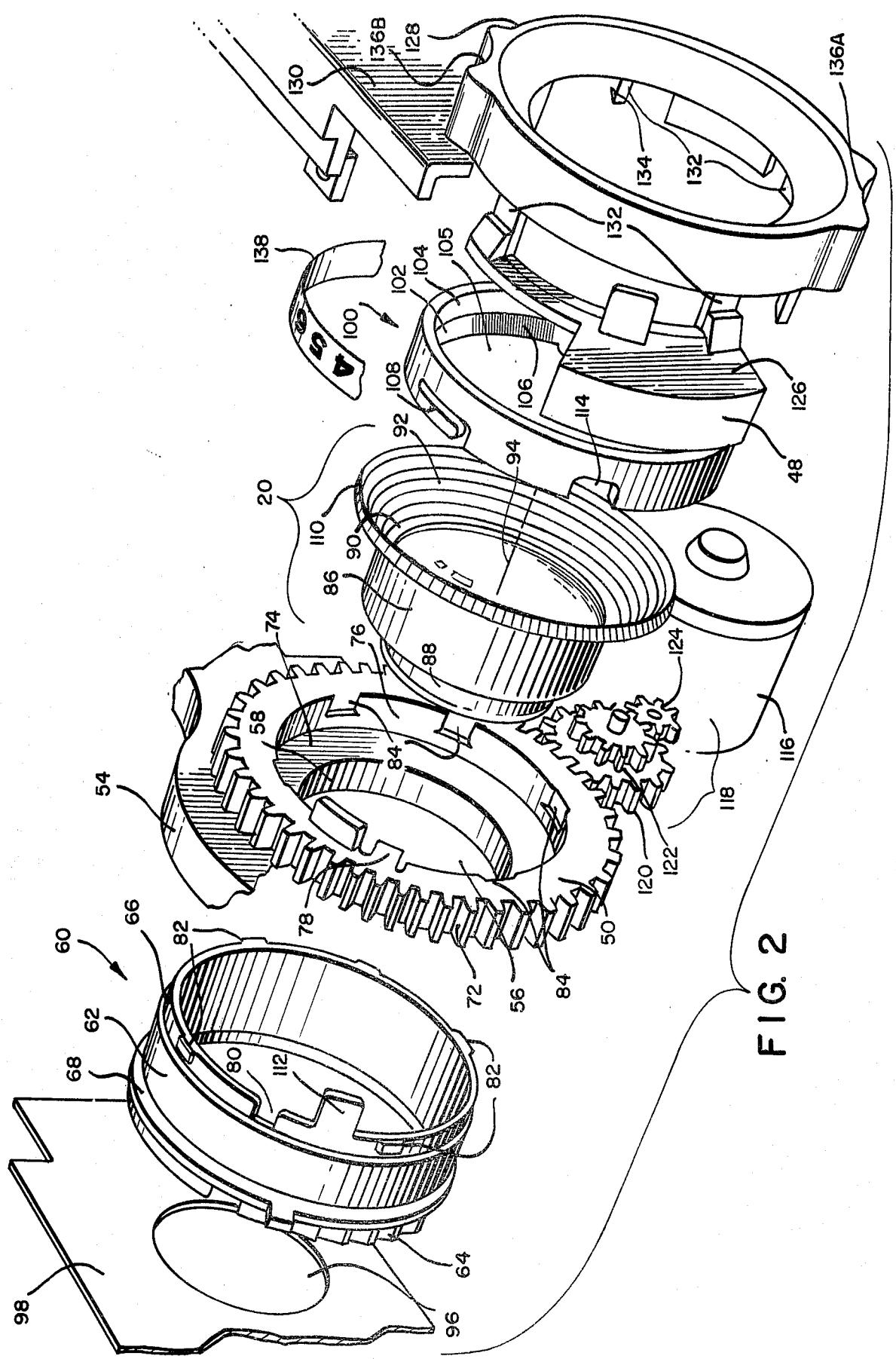
FIG. 2 is an exploded perspective view of the variable focus objective lens mounting and drive means and the combination displaceable cover and focus control selecting lens shield of the present invention.

In FIG. 2, an exploded perspective view of the variable focus objective lens mounting and drive means and the combination displaceable cover and light shield or collar of the present invention, is depicted. Anchor plate 54 is mounted in a fixed position with respect to the housing of camera 10 and provides the main support structure for the variable focus lens 20 actuation means. Anchor plate 54 includes opening 56, of circular cross section, forming cylindrical bearing surface 58 in said anchor plate 54. Ratchet member 60 includes center portion 62 of circular cross section having a cylindrical outer bearing surface, a ratchet wheel 64 at one end thereof and a shoulder portion 66, having a cylindrical outer surface, at the end opposite said ratchet wheel 64 end. Ratchet member 60 is assembled on anchor plate 54 by inserting the shoulder end 66 of said ratchet member 60 through opening 56 of anchor plate 54 to the point where flange 68 of ratchet member 60 engages said anchor plate 54. As so assembled, the cylindrical bearing surface of center portion 62 of ratchet member 60 is supported by cylindrical bearing surface 58 in opening 56 of anchor plate 54, for rotation thereon. Manual focus actuator or focus wheel 50 includes teeth 72 at the periphery thereof and an opening 74 therethrough that forms generally cylindrical surface 76, of circular cross section, in said focus wheel 50. With ratchet member 60 fully assembled on anchor plate 54, shoulder portion 66 of ratchet member 60 extends through opening 56 in anchor plate 54. Focus wheel 50 is assembled on said shoulder portion 66 of ratchet member 60 by aligning tab 78 of focus wheel 50 with slot 80 in shoulder portion 66 of ratchet member 60 and then sliding opening 74 of focus wheel 50 over shoulder portion 66 of ratchet member 60 to the point where fingers 82 on said shoulder portion 66 engage recesses 84 in focus wheel 50 so that said focus wheel 50 is in a fixed position with respect to ratchet member 60 which maintains center portion 62 of ratchet member 60 within opening 56 of anchor plate 54 for rotation therein.

Variable focus lens 20 includes internally threaded cylindrical housing 86 of circular cross section having concentric cylindrical neck portion 88 at one end thereof, said housing 86 having a lens (not shown) for image formation mounted therein. Lens 20 also includes mating, externally threaded cylindrical housing 90, of circular cross section, said housing 90 having an outward tapering end and having a lens for image formation mounted therein. The lenses mounted in housings 86 and 90 cooperate with one another to form an image at focal plane 34 (FIG. 1) in photographic camera 10 along principal image forming or optical axis 94. Variable focus lens 20 is positioned in opening 56 of anchor plate 54 such that cylindrical neck 88 of lens housing 86 extends through circular opening 96 in lens support structure 98, and tapering end 92 of lens housing 90 projects through opening 74 in focus wheel 50. Cylindrical neck 88 of variable focus housing 86 is flaired into frictional engagement with lens support structure 98 once said neck 88 has been fully inserted into lens support structure opening 96, placing said housing 86 in a fixed position with respect to said support structure 98; said support structure 98 being in a fixed position with respect to the housing of camera 10.

Lens retainer ring 100, of generally cylindrical shape, includes cylindrical inner surface 102 and sloping or beveled inner surface 104. Internal cylindrical surface 102 of lens retainer ring 100 includes three groups of parallel grooves 106, said groups being equally spaced around inner surface 102 of lens retainer ring 100 and said grooves being longitudinally oriented in that they are parallel to the central axis through opening 105 in said lens retainer ring 100. Retainer ring 100 also includes three flexible fingers 108 (only one shown) having cams on their inner surfaces, said fingers being equally spaced around and formed from the cylindrical wall of lens retainer ring 100. The radial outer edge of tapering end 92 of housing 90 has a plurality of grooves 110 that are uniformly spaced around said periphery of tapering end 92, said grooves 110 being for cooperative engagement with grooves 106 in cylindrical portion 102 of lens retainer ring 100. Grooves 110 on the periphery of tapered end 92 are parallel to principal image forming or optical axis 94 of variable focus lens 20. Lens retainer ring 100 is placed over the grooved edge of tapering end 92 so that grooves 110 in said end 92 cooperatively engage grooves 106 in cylindrical surface 102 of lens retainer ring 100 such that said cams on the faces of fingers 108 engage the periphery of end 92 forcing said fingers 118 radially outward as retainer ring 100 moves further onto tapering end 92. The cam faces of fingers 108 ultimately disengage the periphery of said end 92 and spring down behind the peripheral edge of said tapering end 92. At this point, lens retainer ring 100 is axially and rotationally locked to housing 90. Also, as lens retainer ring 100 is placed over tapering end 92, tongue 112 projecting from shoulder portion 66 of ratchet member 60 engages slot 114 in lens retainer ring 100. Rotary motion of ratchet member 60 will now be mechanically linked to lens housing 90 by the engagement of said tongue 112 with lens retainer ring 100. The axial movement of lens housing 90 resulting from the focusing of lens 20 will cause movement of retainer ring 100 with respect to ratchet member 60 along principal image forming axis 94. This axial movement of lens housing 90 is compensated for by the movement of tongue 112 either into or out of slot 114 in lens retainer ring 100.

To manually focus variable focus lens 20, a camera operator manually rotates focus wheel 50 about principal image forming axis 94. Rotation of focus wheel 50 about principal image forming axis 94 causes the cylindrical outer surface of center portion 62 of ratchet member 60 to rotate on inner cylindrical surface 58 of anchor plate 54. Rotation of ratchet member 60 causes the rotation of lens retainer ring 100 because of tongue member 112 in ratchet member 60 being mechanically linked with slot 114 in lens retainer ring 100. With lens retainer ring 100 and housing 90 being in a fixed relation with respect to one another as previously described, movement of retainer ring 100 causes the movement of housing 90 and the lens mounted therein. With lens housing 86 maintained in a fixed position by its frictional engagement with lens mounting structure 98, housing 90 of variable focus lens 20 is rotatably and axially moved about and along principal image forming axis 94 as the external threads on cylindrical housing 90 are threaded into or out of the internal threads of cylindrical housing 86. The rotation of housing 90 of variable focus lens 20 with respect to lens housing 86 causes a change in the effective focal length of variable focus lens 20.

For powered movement of variable focus lens 20, a lens drive signal is supplied to rotary actuator or motor 116 of autofocus drive means 26 (FIG. 1) as the result of the keying of rangefinding means 12 (FIG. 1) by the actuation of manual key 18 (FIG. 1). Motor 116 is mounted in a fixed position with respect to anchor plate 54 and is coupled to focus wheel 50 through gear train 118. Gear train 118 includes a clutch which is comprised of clutch gear 120 and clutch pinion gear 122, said gears being rotatably and coaxially mounted on anchor plate 54, said clutch gear 120 being urged into frictional engagement with clutch pinion gear 122 by spring means (not shown), such that rotation of clutch pinion gear 122 causes the rotation of clutch gear 120. Clutch pinion gear 122 is rotatably driven by motor pinion gear 124, said gears 122 and 124 being in a meshed relation and said motor pinion gear 124 being in a fixed relation with respect to the rotor shaft of drive motor 116. The teeth of clutch gear 120 are in a meshed relation with respect to the teeth 72 on focus wheel 50 and therefore the rotation of the rotor of motor 116 will result in the rotation of focus wheel 50. When variable focus lens 20 has been focused to the correct subject-in-focus position as determined by lens position sensing means (not shown) in correct focus sensor 30 (FIG. 1), a pawl (not shown) is caused to engage ratchet wheel 64 on ratchet member 60 thereby stopping said variable focus lens 20 at said correct subject-in-focus position. The effect on variable focus lens 20 of rotating focus wheel 50 about principal image forming axis 94 by motor 116 is the same as that resulting from the manual rotation of said focus wheel 50 by a camera 10 operator.

As can be seen from the foregoing, rotation of motor 116 will result in the simultaneous rotation of focus wheel 50. If a camera 10 operator attempts to manually focus lens 20 while automatically focusing said variable focus lens 20 by motor 116, said focusing will be interferred with and may even be prevented. To avoid this problem, cover 48 is provided to impede access to the peripheral teeth 72 of focus wheel 50 during automatic focusing.

Arm 126 extends laterally from two projections 132 of automatic/manual (A/M) light shield or collar 128, said arm 126 terminating in a curved outer end or cover 48, said cover conforming to the shape of a smooth curve formed by a line connecting points located on the periphery of focus wheel 50. As an alternate arrangement, collar 128 and cover 48 could be mechanically linked to one another such that cover 48, in the form of a flat plate, translates as collar 128 is rotated. However, the preferred construction is to make collar 128 and cover 48 of a single molded piece. A/M collar 128, of generally cylindrical shape, is mounted for rotation about principal image forming axis 94, said collar 128 being rotatably mounted in a circular opening in camera housing 130. A/M collar 128 rotates on the outer surfaces of a plurality of projections 132 that are equally spaced around the cylindrical periphery of said collar 128, said projections extending from said A/M collar 128 in the same direction as that of principal image forming axis 94, said axis 94 being aligned with the longitudinal central axis of said collar 128. Two of these projections have flexible free ends 134 with raised portions on an outer surface that grip an inner surface of housing 130 once said A/M collar 128 has been fully inserted through the opening in housing 130 in which said collar is mounted. The other two 132 projections provide the structural support for arm 126 and cover 48 as previously noted. A/M collar 128 projects substantially beyond housing 130 so that said collar can be readily gripped by a camera 10 operator. The position of A/M collar 128 is such that it is spaced from and does not interfere with the axial movement of housing 90 of variable focus lens 20 as said lens is moved through its entire focusing range. Cover 48 is rotated about principal image forming axis 94 by the manual rotation of A/M collar 128. To facilitate the manual rotation of A/M collar 128, a pair of projections 136a, 136b have been provided on the outer cylindrical surface of A/M collar 128, said projections having concave surfaces at the outer extremities thereof. Subject distance indicia 138 is provided to indicate the in-focus subject distance from variable focus lens 20, said indicia 138 being mounted on lens retainer ring 100. The operation of combination A/M collar and displaceable cover 48, and the functioning of distance indicating indicia 138 can be more clearly understood by referring to FIG. 3.

Figure 3:
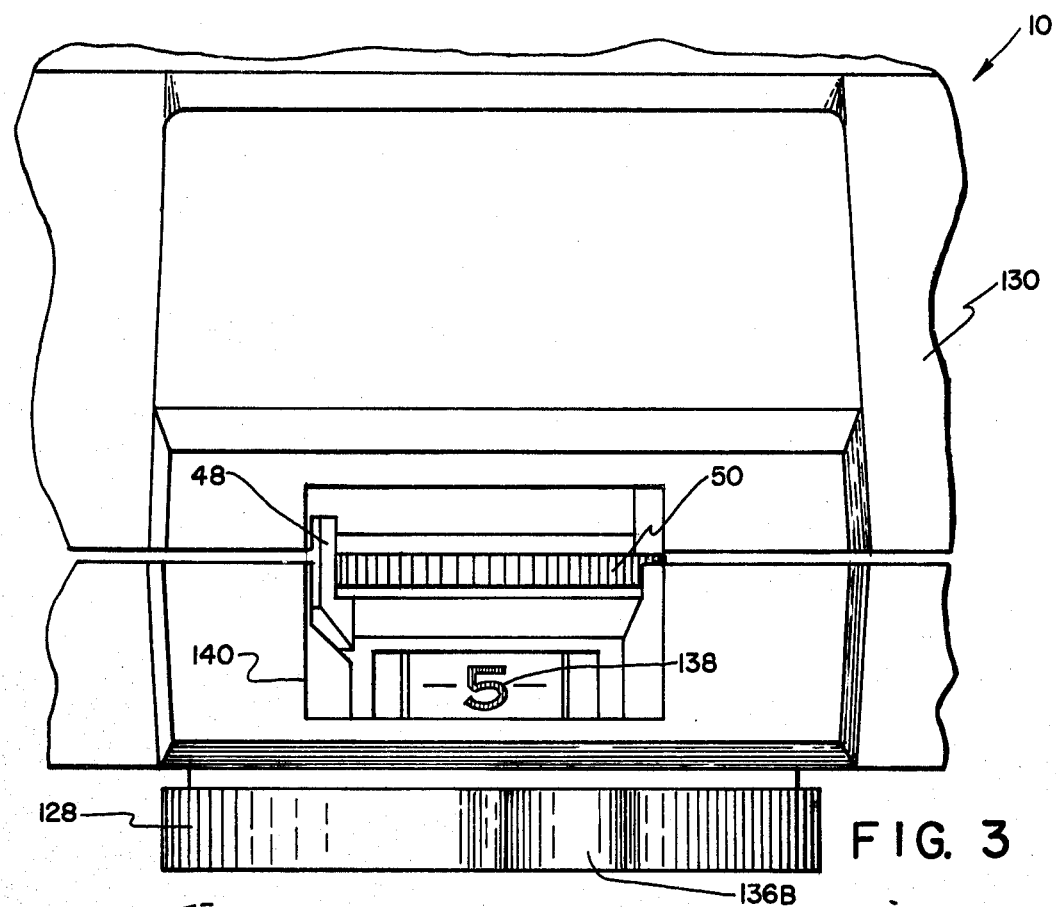
FIG. 3 is a top view of a photographic camera depicting a manual focus wheel, a protective cover for said manual focus wheel in its displaced position, and subject distance indicia positioned on said camera's objective lens mounting means, through an opening in the housing of said camera.

In FIG. 3, focus actuator wheel 50 is visible through opening 140 in housing 130 of photographic camera 10. Photographic camera 10 is shown in its manual focus position in that displaceable cover 48 has been moved to its displaced position making said focus wheel 50 readily accessible to a camera 10 operator for manual movement thereof. Indicia 138 is positioned on lens retainer ring 100 such that said indicia 138 is visible through said opening 140 to a camera 10 operator. Indicia 138 indicates the actual distance to the subject to be photographed once focusing, whether manual or automatic, is complete. As previously described, A/M collar 128 and displaceable cover 48 form a unitary structure and therefore the rotation of A/M collar 128 will result in the rotation of said cover 48.

Figure 4:
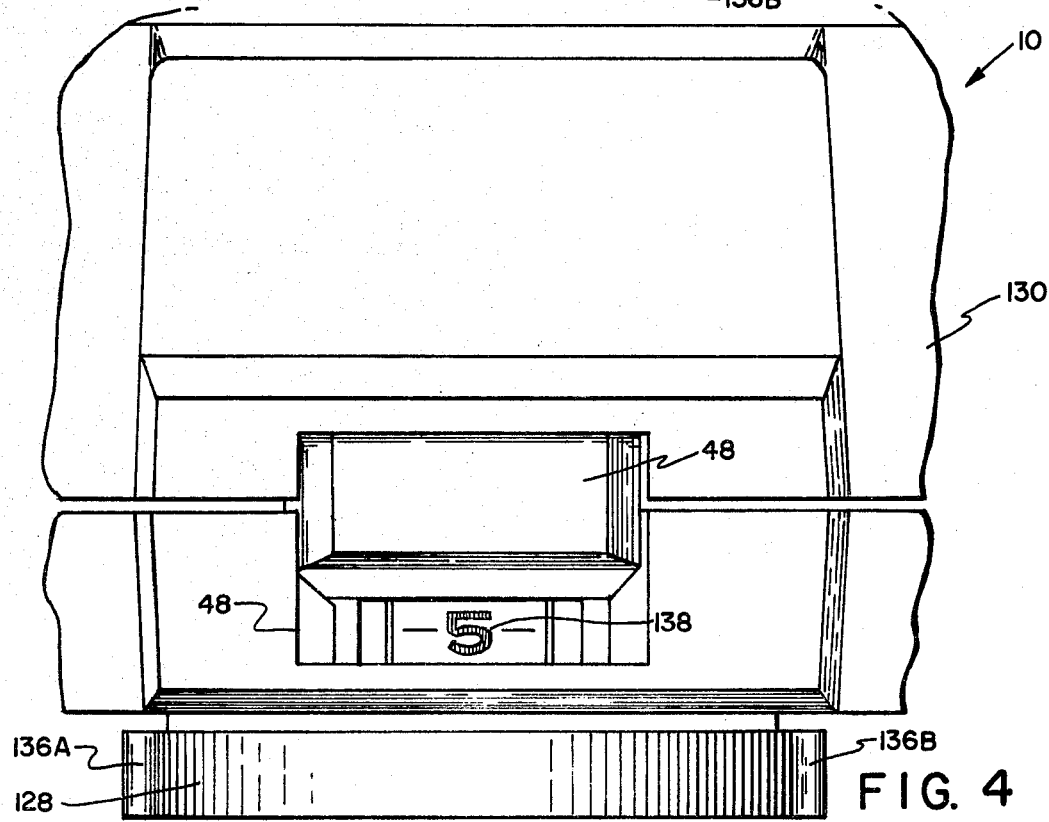
FIG. 4 is the same view as that depicted in FIG. 3 except that the displaceable cover is shown in its protective position where it impedes access to the manual focus wheel of said photographic camera.

In FIG. 4, the automatic focus control mode of photographic camera 10 is depicted in that displaceable cover 48 has been moved from a position where it permits ready access to focus wheel 50 (FIG. 3) to a position where such access is prevented by cover 48, said cover having been rotated to its protective position by the rotation of A/M collar 128. Subject-in-focus indicia 138 is visible through opening 140 of housing 130 when said displaceable cover 48 is either in its protective or displaced positions.

Figure 5:
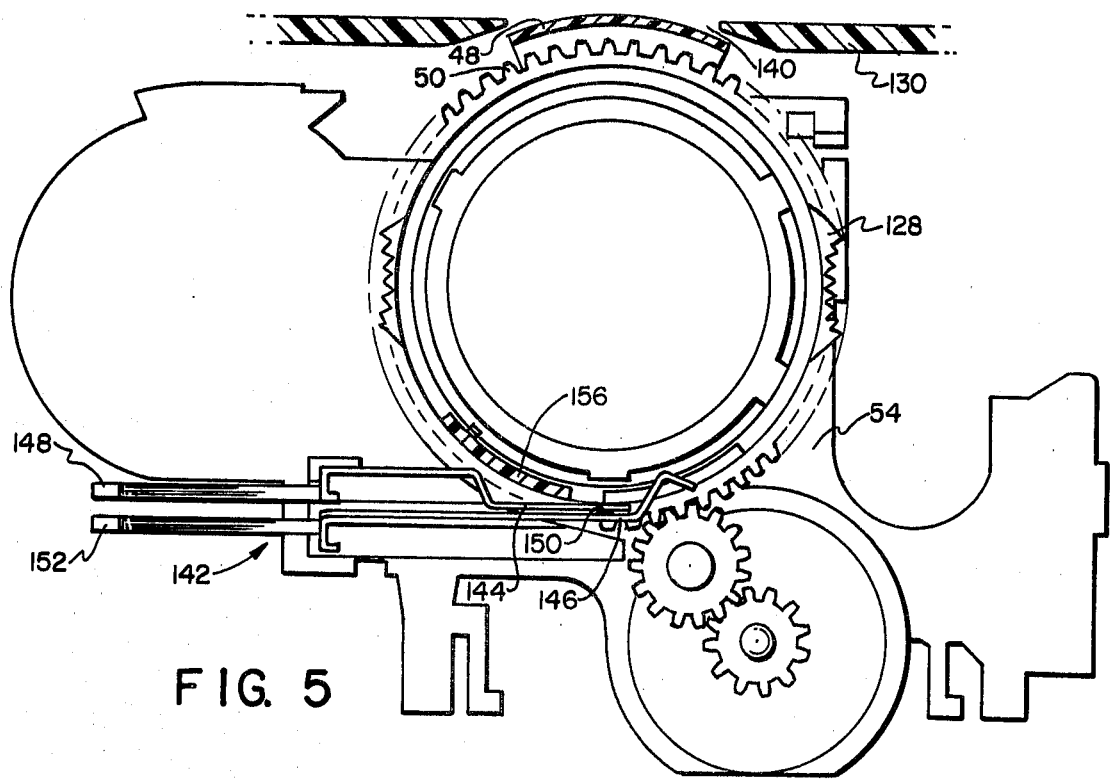
FIG. 5 is a front elevational view of switch means for controlling power to a portion of the automatic focus control system of the present invention, said switch being shown in its closed position.
Figure 6:
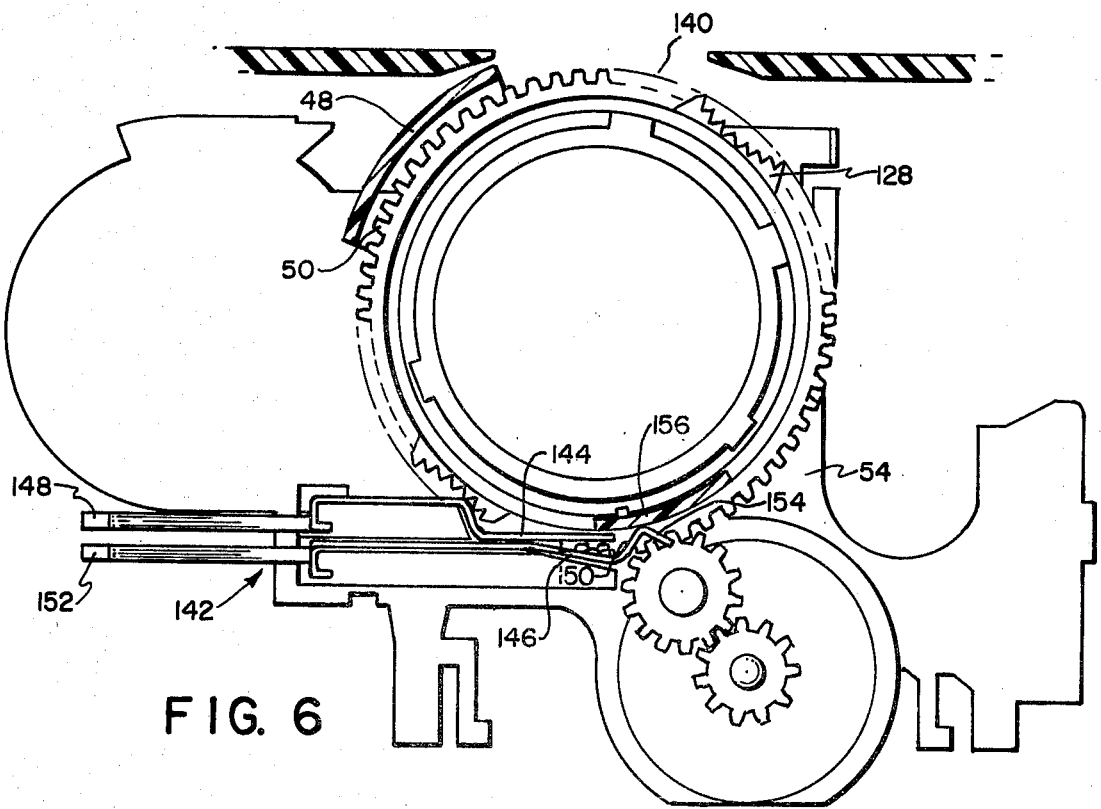
FIG. 6 is the same view as that depicted in FIG. 5 except that said switch means has been actuated to its open position by an arm projecting from the rotatably mounted combination displaceable cover and lens shield of the present invention.

When A/M collar 128 is placed in its manual position, a portion of the power being supplied to the automatic focus control system is disconnected because such power normally serves no useful purpose and unnecessarily shortens camera battery life. In FIG. 5, a front elevational view of switch means for controlling power to a portion of the automatic focus control system of the present invention is depicted. Switch 142 is shown mounted on anchor plate 54, said switch being in its automatic or closed position. Switch 142 includes fixed finger 144 and flexible or movable finger 146. A portion of the power being supplied to the automatic focus control system enters lead 148 of switch 142, passes through finger 144, contact 150 mounted on flexible finger 146, enters finger 146 and exits through lead 152. With A/M collar 128 in its automatic position, focus wheel 50 is not accessible through opening 140 in housing 130 because of the protective position of cover 48. To manually focus variable focus lens 20 (FIG. 2) in camera 10, the A/M collar 128 is rotated to its manual position. FIG. 6 shows the relationship between switch 142 and A/M collar 128 when said collar 128 has been rotated to said manual position.

In FIG. 6, power being supplied to the automatic focus control system of photographic camera 10 through switch 142 has been interrupted because said switch 142 has been moved to its open position. Finger 146 of switch 142 includes extension 154. As A/M collar 128 is rotated from its automatic to its manual position, arm 156 projecting from A/M collar 128 engages said extension 154 of finger 146 forcing said finger 146 and contact 156 mounted thereon out of electrical contact with finger 144, thereby interrupting the flow of power to the automatic focus control system passing through switch 142. With cover 48 moved to its displaced position, focus wheel 50 is readily accessible to a photographic camera 10 operator through opening 140 in housing 130. As noted, when cover 48 is in its displaced position, a portion of the power being supplied to the photographic camera 10 automatic focus control system is interrupted. To reestablish this power to said automatic focus control system, A/M collar 128 is rotated clockwise to its automatic position which places displaceable cover 48 in its protective position thereby reestablishing the electrical connection between fingers 144 and 146 of switch 142.

GENERAL CONSIDERATIONS

The present invention has been described as one that is primarily for use with a variable focus lens system having both automatic and manual focus controls wherein said automatic focus control includes an acoustical type rangefinder for determining subject distance. However, it should be noted that the present invention also has application to any variable focus lens system having both manual and automatic focus controls wherein said controls are coupled to one another in a driving relationship and where actuation of the manual focus control actuator while focusing automatically, will interfere with or prevent said automatic focusing. Disconnecting a portion of the electrical load created by the automatic focus control system while manually focusing is also useful for such variable focus lens systems, and the extent of electrical load removal would depend upon the particular type of automatic focus control system that is being utilized.

The term objective lens as used herein means a single lens or a system of lenses that form an image of an object. This term is not limited to a single lens of a lens system that is nearest the subject to be viewed, or to be photographed.

The term portion as used herein means either all, or less than all, of the quantity under consideration. This term is not limited to fractional parts of the quantity under consideration and can and may very well include all of said quantity.

The term electrical power as used herein means either signal or basic supply power, or both. Such a term is not limited to the nonsignal type of power.

The term automatic focus control system as used herein means that once it has been manually initiated, this particular control system will automatically determine the distance to the subject under consideration by sensing energy, whether acoustical or radiant, reflected from said subject and then couple this distance information, in the appropriate form, to a variable focus lens system for the purpose of positioning said lens system to its correct subject-in-focus position. The automatic focus control system as the term is used herein, will both determine subject distance and position the variable focus lens system to the correct position once an automatic focus control sequence has been initiated, without further involvement with the entity that has initiated said sequence.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:
1. A camera comprising:
 a first actuator for selectively coupling said camera to a source of energy;
 a housing member having a first opening and a second opening;
 a shutter mechanism mounted in said housing;
 a variable focus objective lens mounted on said housing with its optical axis aligned with said first opening of said housing;
 energizable first means for deriving a signal representative of the actual distance between said apparatus and an object remote therefrom;
 second means normally responsive to the operation of said first actuator for rendering said first means operative and then focusing said objective lens dependent upon the signal derived by said first means and then actuating said shutter mechanism, said second means including a second actuator displaceably mounted so as to be manually accessible through said second opening of said housing member, and third means for coupling said second actuator to said objective lens so that the focusing of said objective lens may be varied responsive to manual actuation of said second actuator;
 a cover member;
 a collar coupled to said cover member and disposed peripherally of said objective lens and extending exteriorally of said housing for manual access, said collar being rotatably mounted for displacement between a first position wherein said cover member is disposed over said second opening of said housing to preclude manual access to said second actuator and a second position wherein said cover member is positioned out of alignment with said second opening of said housing to provide manual access through said second opening of said housing to said second actuator; and
 means responsive to the displacement of said cover member from its said first position into its said second position for disabling said first means so that said second means is responsive to the operation of said first actuator for purposes of actuating said shutter mechanism but not responsive to the operation of said first actuator for purposes of focusing said objective lens dependent upon a signal derived by said first means.

2. A camera as defined in claim 1 wherein said cover member is mounted for rotation about the optical axis of said variable focus objective lens.

3. A camera as defined in claim 1 wherein said cover member and said collar form a unitary structure.

4. The invention of claim 3 wherein said unitary structure is mounted for rotation about the optical axis of said variable focus lens system.

5. A camera as defined in claim 1 wherein said collar is mounted for rotation about the optical axis of said variable focus objective lens.

6. The invention of claim 5 wherein said first housing opening is of circular cross section forming a wall in said housing, said collar is of generally cylindrical shape with a cylindrical outer surface, is of circular cross section, and has a longitudinal central axis that is aligned with the optical axis of said variable focus lens, said collar includes a plurality of projections that are parallel to said longitudinal axis, said projections having a radial outer surface for rotation on said first housing wall and having raised portions on said radial outer surface for gripping an inner surface of said housing thereby locking said collar to said housing in the direction of said longitudinal axis of said collar.

7. The invention of claim 6 wherein a projection includes an arm projecting outwardly therefrom in a direction that is generally orthogonal to said longitudinal axis of said collar, the outer end of said arm terminating in said cover member.

8. The invention of claim 7 wherein said cylindrical surface of said collar includes a pair of outward projections extending radially therefrom, said projections being diametrically spaced from one another on said cylindrical outer surface, the outermost portion of each projection having a surface of generally concave shape.

9. A camera as defined in claim 1 wherein said variable focus objective lens includes at least two lens elements, at least one of said elements being rotatably and axially movable with respect to another of said elements and said collar is positioned in said housing such that it does not restrict axial movement of said movable lens element as said movable lens element of said variable focus lens is moved throughout its entire focusing range.

10. A camera as defined in claim 1 wherein said variable focus objective lens includes at least two lens elements, at least one of said elements being rotatably and axially movable with respect to another of said elements and said second actuator is a gear that is mounted for rotation about the optical axis of said variable focus lens, said gear being coupled to said movable lens element for movement therewith.

11. A camera as defined in claim 1 wherein said variable focus objective lens includes at least two lens elements, at least one of said elements being rotatably and axially movable with respect to another of said elements, said camera further comprising subject distance indicia, said indicia being mounted for movement with said movable lens element, said indicia being viewable through said second opening.

* * * * *